(12) United States Patent
Braden et al.

(10) Patent No.: US 9,072,403 B2
(45) Date of Patent: Jul. 7, 2015

(54) HOME APPLIANCE WITH IMPROVED GRIDDLE INSULATION RETAINER

(75) Inventors: Ben Braden, Lafollette, TN (US);
Charlie Hanna, Knoxville, TN (US);
Timothy Russell, Jacksboro, TN (US)

(73) Assignee: BSH Home Appliances Corporation, Irvine, CA (US)

( * ) Notice: Subject to any disclaimer, the term of this patent is extended or adjusted under 35 U.S.C. 154(b) by 154 days.

(21) Appl. No.: 13/461,929

(22) Filed: May 2, 2012

(65) Prior Publication Data

US 2013/0292371 A1    Nov. 7, 2013

(51) Int. Cl.
*A47J 37/10*    (2006.01)

(52) U.S. Cl.
CPC ............... *A47J 37/10* (2013.01); *A47J 37/108* (2013.01)

(58) Field of Classification Search
USPC .............. 219/452.12, 452.11, 450.1; 99/422; 126/39 R, 40, 39 J, 39 K, 39 BA, 1 R, 24, 126/25 R, 30, 27, 26, 3 R, 39 B, 39 H, 211, 126/217, 81, 218
See application file for complete search history.

(56) References Cited

U.S. PATENT DOCUMENTS

| | | | | |
|---|---|---|---|---|
| 764,487 | A | * | 7/1904 | Morrison ..................... 217/65 |
| 1,653,797 | A | * | 12/1927 | Brand ........................... 219/392 |
| 1,897,879 | A | * | 2/1933 | Antrim ......................... 219/403 |
| 2,767,298 | A | * | 10/1956 | Fry ............................... 219/395 |
| 2,843,716 | A | * | 7/1958 | Del Francia ............... 219/450.1 |
| 3,008,406 | A | * | 11/1961 | Reeves et al. ................... 99/446 |
| 3,034,419 | A | * | 5/1962 | Hillebrand et al. ............. 99/340 |
| 3,113,358 | A | * | 12/1963 | Zell et al. ....................... 312/263 |
| 3,143,638 | A | * | 8/1964 | Scott ............................. 219/395 |
| 3,176,118 | A | * | 3/1965 | Scott ............................. 219/394 |
| 3,545,712 | A | * | 12/1970 | Ellis ......................... 248/222.11 |
| 3,797,375 | A | * | 3/1974 | Cerola ............................ 99/340 |
| 4,431,892 | A | * | 2/1984 | White ............................ 219/623 |
| 4,567,769 | A | * | 2/1986 | Barkhoudarian ............... 73/643 |
| 4,778,978 | A | * | 10/1988 | Schreder et al. ........... 219/451.1 |
| 4,862,795 | A | * | 9/1989 | Hawkins ......................... 99/446 |
| 4,880,952 | A | * | 11/1989 | Hirai et al. .................... 219/685 |
| 5,215,074 | A | * | 6/1993 | Wilson et al. ............. 126/214 R |
| 5,301,653 | A | * | 4/1994 | Gerdes et al. ................ 126/39 E |
| 5,310,066 | A | * | 5/1994 | Konstant ....................... 211/193 |
| 5,465,533 | A | * | 11/1995 | Rummo et al. .................. 52/60 |
| 5,517,005 | A | * | 5/1996 | Westerberg et al. .......... 219/685 |
| 5,736,713 | A | * | 4/1998 | Westerberg ................... 219/411 |
| 6,041,557 | A | * | 3/2000 | Brown et al. .................... 52/60 |
| 6,114,665 | A | * | 9/2000 | Garcia et al. ................. 219/404 |
| 6,271,504 | B1 | * | 8/2001 | Barritt ...................... 219/452.13 |

(Continued)

*Primary Examiner* — Tu B Hoang
*Assistant Examiner* — Jimmy Chou
(74) *Attorney, Agent, or Firm* — James E. Howard; Andre Pallapies

(57) ABSTRACT

A home appliance having a griddle includes an appliance body; a cooktop on the appliance body and defining a griddle space; a griddle housing in the body adjacent the griddle space and operatively associated with the griddle; a griddle insulation retainer for removable disposition within the griddle space for supporting insulation material intermediate the griddle and the griddle insulation retainer, the griddle insulation retainer including a base and a wall; and a mounting arrangement for mounting the griddle insulation retainer to the range body including a first mating component on the griddle insulation retainer and a second mating component on the griddle housing, wherein the first mating component is removably joined to the second mating component in a press-fit manner.

24 Claims, 10 Drawing Sheets

(56) References Cited

U.S. PATENT DOCUMENTS

| | | | |
|---|---|---|---|
| 6,399,925 B1 * | 6/2002 | Pickering et al. | 219/452.13 |
| 6,866,034 B2 * | 3/2005 | Han et al. | 126/41 R |
| 7,065,928 B1 * | 6/2006 | Lane et al. | 52/200 |
| 7,189,950 B2 * | 3/2007 | Ko | 219/685 |
| 7,227,106 B2 * | 6/2007 | Sung et al. | 219/452.11 |
| D615,800 S * | 5/2010 | Grey et al. | D7/340 |
| 7,781,702 B2 * | 8/2010 | Nam et al. | 219/391 |
| 8,074,563 B2 * | 12/2011 | Bowles et al. | 99/422 |
| 8,312,873 B2 * | 11/2012 | Gagas et al. | 126/299 D |
| 2002/0043529 A1 * | 4/2002 | Pickering et al. | 219/452.13 |
| 2009/0126715 A1 * | 5/2009 | Grassi et al. | 126/39 R |
| 2010/0186603 A1 * | 7/2010 | Bowles et al. | 99/422 |

* cited by examiner

HOME APPLIANCE WITH IMPROVED GRIDDLE INSULATION RETAINER

BACKGROUND OF THE INVENTION

The present invention relates broadly to home appliances for cooking and, more particularly, to a range having a griddle for cooking and an improved griddle insulation retainer.

Ranges provide a number of cooking options through, for example, ovens, steamers, cooktops and griddles. Ranges that include griddles can use the griddle space as the primary access point into the cooktop for service, since there are significant control electronics located underneath the griddle. In general, a griddle will provide a substantially constant temperature field across the griddle surface. As may be expected, the area underneath the griddle also experiences elevated temperatures. Accordingly, in order to protect the electronic components underneath the griddle, and to enhance efficiency, insulation is provided under the griddle. In order to support the insulation, a griddle insulation retainer is provided in the form of a generally planar sheet-metal structure.

Since the griddle provides a primary access point to the control electronics underneath the griddle, the ability to efficiently and effectively remove the griddle insulation retainer for electronics access can be important in most any repair operation. Further, the griddle insulation retainer needs to be installed in a straightforward manner for both manufacturing and for closing up the griddle space after repair.

In the past, such griddle insulation receivers were held in place with a number of screws, which made them difficult to install and remove. The screws had to be placed through openings that are maintained in registry and then screwed in place. For installation, a user had to position the griddle insulation retainer against the proper support members such that the screw openings came into registry and that position had to be maintained while a screw was inserted and tightened, which could be a difficult operation at best.

Additionally, using such attachment arrangements, the griddles themselves can sag and become unlevel after being unpackaged during range installation. Accordingly, the structural integrity of the griddle insulation retainer required improvement to address these concerns.

SUMMARY OF THE INVENTION

The present invention is accordingly intended to provide a home appliance having an improved griddle insulation retainer that is mounted to the home appliance in a straightforward manner.

It is another object of the present invention provide a griddle insulation retainer that includes a mounting arrangement that adds stability to the overall griddle structure.

To those ends, the present invention is directed to a home appliance having a griddle including an appliance body and a cooktop disposed on the appliance body and defining a griddle space. A griddle housing is in the body adjacent the griddle space and operatively associated with the griddle. A griddle insulation retainer is provided for removable disposition within the griddle space for supporting insulation material intermediate the griddle and the griddle insulation retainer with the griddle insulation retainer including a base and a wall. A mounting arrangement is also provided for mounting the griddle insulation retainer to the range body including a first mating component on the griddle insulation retainer and a second mating component on the griddle housing, wherein the first mating component is removably joined to the second mating component in a press-fit manner.

It is preferred that the mounting arrangement is also provided for mounting the griddle insulation retainer to the appliance body including a tab on the wall of the griddle insulation retainer and a receiver on the griddle housing.

Preferably, the griddle housing includes a cross-member having the tab receiver, which may be a bridge lance.

It is preferred that the griddle insulation retainer includes a generally planar base with the wall extending a predetermined distance away from the base, and wherein the tab extends to a position generally equal to the outward extent of the wall. Alternately, the griddle insulation retainer may include a generally planar base with the wall extending a predetermined distance away from the base, and wherein the tab extends to a position less than equal to the outward extent of the wall.

It is preferable that the griddle housing include a cross-member having two tab receivers and spaced a predetermined distance apart, and the griddle insulation retainer includes two tabs for receipt in the two tab receivers.

It is further preferred that the cross-member includes a projection on the cross-member and projecting into the griddle space, the projection being disposed intermediate the two tab receivers.

Preferably, the griddle insulation retainer includes one of a front wall having a downwardly directed tab and a rear wall having a downwardly directed tab.

It is preferred that the griddle insulation retainer includes a downwardly directed wall having a downwardly directed tab and the griddle housing includes a cross-member having a tab receiver. It is further preferred that the griddle insulation retainer includes two downwardly directed walls, with each wall having two downwardly directed tabs and the griddle housing includes two cross-members, with each cross-member having two bridge lances for receiving the two tabs.

It is preferable that the present invention further include a projection on one of the cross-members intermediate the bridge lances and projecting into the griddle space.

Preferably, the griddle insulation retainer includes a generally planar base member defining an opening for facilitating manual removal of the griddle insulation retainer from the griddle housing.

The present invention is also directed to a range. According to another preferred embodiment of the present invention, a range having a griddle includes a range body; a cooktop on the range body and defining a griddle space; and a griddle housing in the body adjacent the griddle space and operatively associated with the griddle. The present invention further includes a griddle insulation retainer for removable disposition within the griddle space for supporting insulation material intermediate the griddle and the griddle insulation retainer, the griddle insulation retainer including a base and a wall. A mounting arrangement is provided for mounting the griddle insulation retainer to the range body including a first mating component on the griddle insulation retainer and a second mating component on the griddle housing, wherein the first mating component is removably joined to the second mating component in a press-fit manner.

It is preferred that the mounting arrangement includes a tab on a wall of the griddle insulation retainer and a tab receiver on the griddle housing.

Preferably, the griddle housing includes a cross-member having the tab receiver. Further, it is preferred that the tab receiver is a bridge lance.

It is preferred that the griddle insulation retainer include a generally planar base with the wall extending a predetermined distance away from the base, and wherein the tab extends to a position generally equal to the outward extent of the wall. Further, the griddle insulation retainer may include a generally planar base with the wall extending a predetermined distance away from the base, and wherein the tab extends to a position less than equal to the outward extent of the wall.

It is preferred that a cross-member having two tab receivers spaced a predetermined distance apart, and the griddle insulation retainer includes two tabs for receipt in the two tab receivers.

Preferably, the present range includes a projection on the cross-member and projecting into the griddle space, the projection being disposed intermediate the two tab receivers.

It is preferred that the griddle insulation retainer includes one of a front wall having a downwardly directed tab and a rear wall having a downwardly directed tab.

In addition, the griddle insulation retainer may preferably include a downwardly directed wall having a downwardly directed tab and the griddle housing includes a cross-member having a tab receiver. Further, the griddle insulation retainer may preferably include two downwardly directed walls, with each wall having two downwardly directed tabs and the griddle housing includes two cross-members, with each cross-member having two bridge lances for receiving the two tabs. Additionally, the present range may include a projection on one of the cross-members intermediate the bridge lances and projecting into the griddle space.

Preferably, the griddle insulation retainer includes a generally planar base member having an opening for facilitating manual removal of the griddle insulation retainer from the griddle housing.

By the above the present invention provides a home appliance in the form of a range having a griddle insulation retainer that provides enhanced ease of installation and removal thereof as well as enhanced griddle stability.

DESCRIPTION OF THE PREFERRED EMBODIMENT

Figure 1:
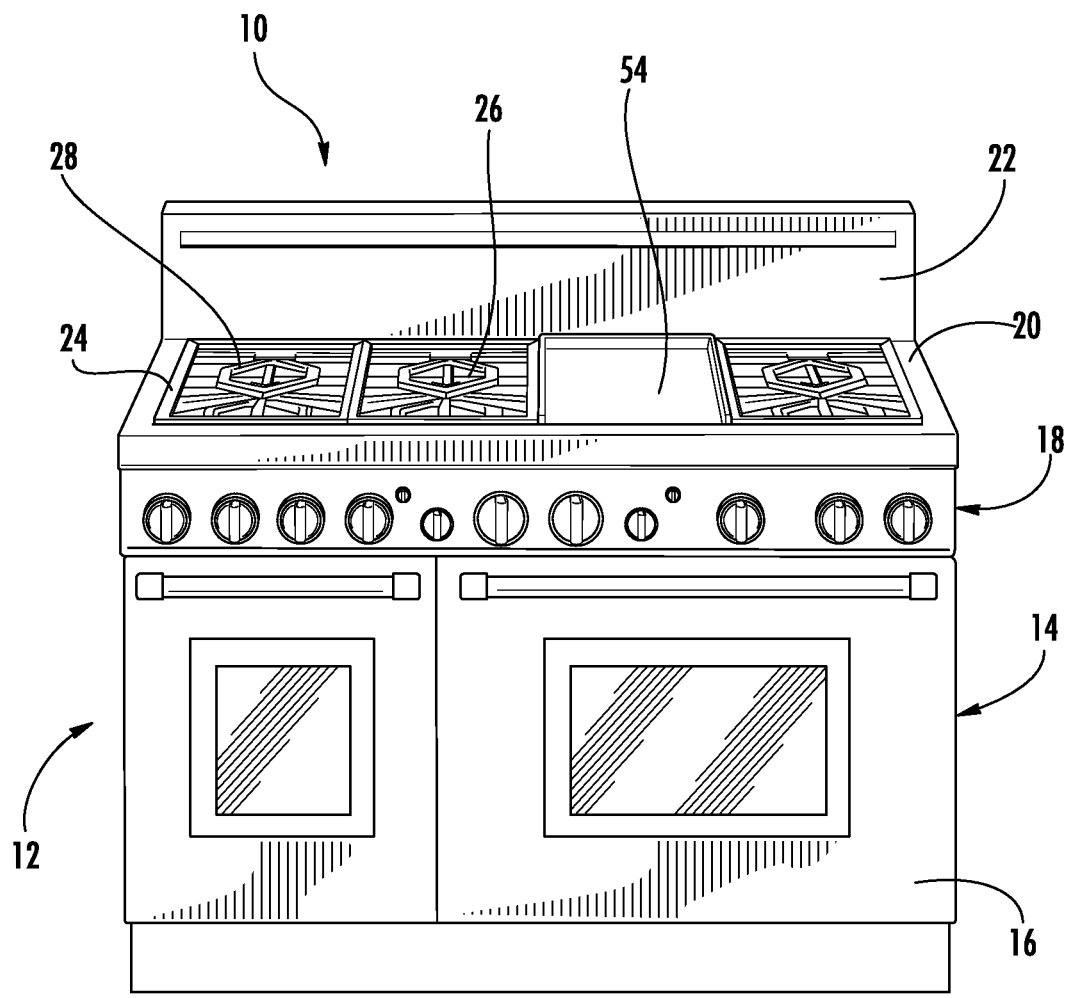
FIG. 1 is a front view of a range having a griddle and a griddle insulation retainer according to one preferred embodiment of the present invention.

Turning now to the drawings and, more particularly to FIG. 1, a range having an improved griddle insulation retainer is illustrated generally at 10 and includes a floor-standing range body 12 with two cavities in a lower portion 14 of the range body 12. As is generally known, many ranges provide a single oven cavity while others, such as the one pictured, define two cavities, both of which way may be an oven. Alternately, the configuration may be, for example, a single oven with a steamer or a warming drawer in the same range body 12. The cavities are covered by movable doors 16.

A cooktop 20 is disposed on a top portion of the range body 12. The cooktop 20 includes a plurality of aligned burner pans 24, with each burner pan 24 supporting a burner 26 which may be electric or gas as the range 10 may be powered by electricity, gas or both, as in the case of a "dual-fuel" range. A generally planar upstanding backsplash 22 is provided at a rearward portion of the cooktop 20. Grates 28 are aligned along the cooktop 20 to support cooking utensils above a flaming burner for cooking. A control panel 18 is disposed above the door 16, allowing a user to control cooking throughout the range 10. A backsplash 22 is an upstanding shield behind and above the cooktop 20 to protect the wall behind the range 10.

Figure 2:
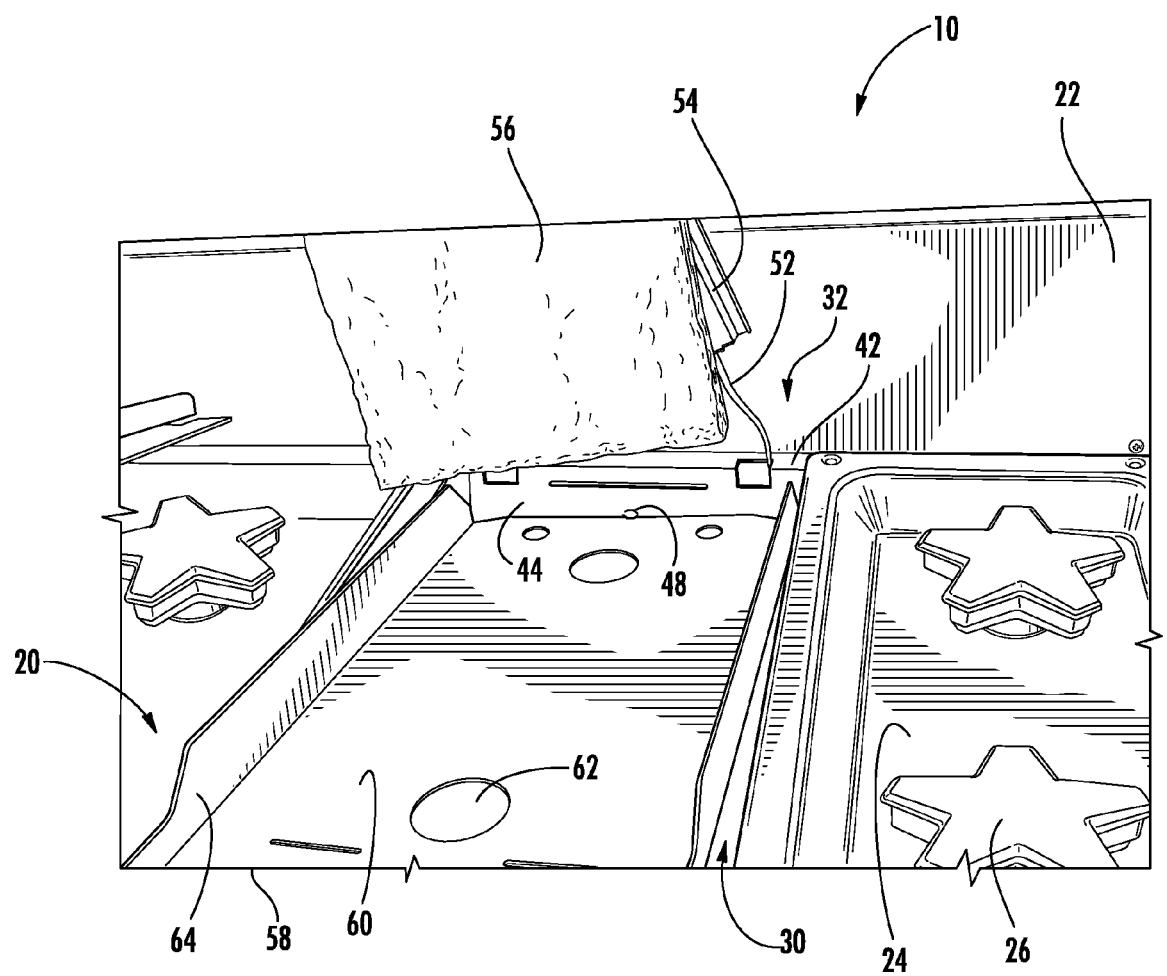
FIG. 2 is a front perspective view of a griddle insulation retainer according to one preferred embodiment of the present invention partially installed in a range as illustrated in FIG. 1.

On certain ranges, like the one illustrated in FIG. 1, a griddle 54 may be provided in a griddle space 30 defined intermediate two burner pans 24, as seen in FIG. 2. There, the cooktop 20 defines a griddle housing 32 having components for fueling, controlling and supporting the griddle 54. The griddle 54 is powered via conventional wiring 52.

Figure 3:
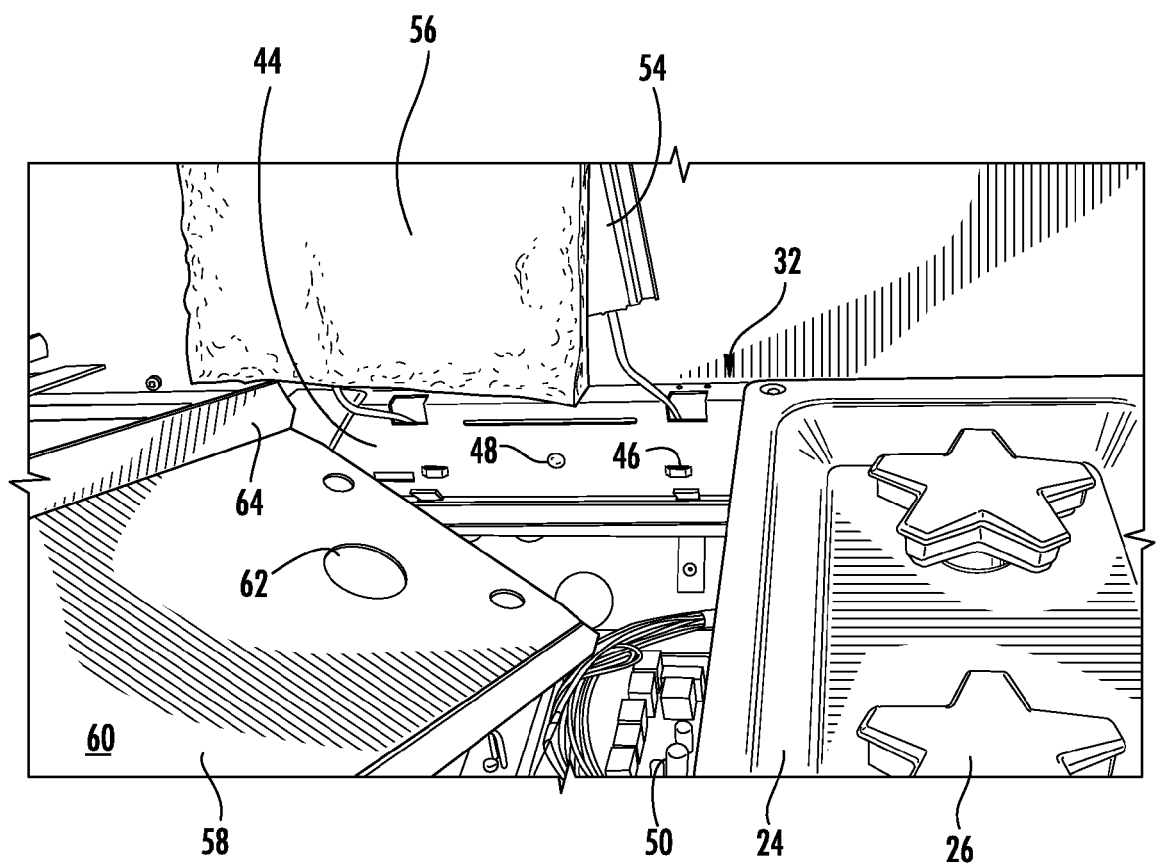
FIG. 3 is a front perspective view of a range having the griddle insulation retainer partially removed from the range illustrated in FIG. 2.

With continued reference to FIG. 2, the griddle space 30 is illustrated intermediate two burner pans 24 containing two burners 26 each. A rear support member 40 is provided to support, among other things, a griddle insulation retainer illustrated at 58 which supports a sheet of insulation 56 above the griddle insulation retainer 58 and below the griddle 54. As seen in FIG. 3, many of the range electronics 50 are below the griddle space 30 such that the griddle 54, insulation 58 and griddle insulation retainer 58 must be removed for access to such electronics 50. Further, the components need to be protected from the griddle heat, hence the insulation 56 and griddle insulation retainer 58.

The present invention provides convenient mounting for the griddle insulation retainer 58 as seen in FIGS. 2 and 3 by providing mating components that press-fit, preferably without the use of hand tools.

Figure 4:
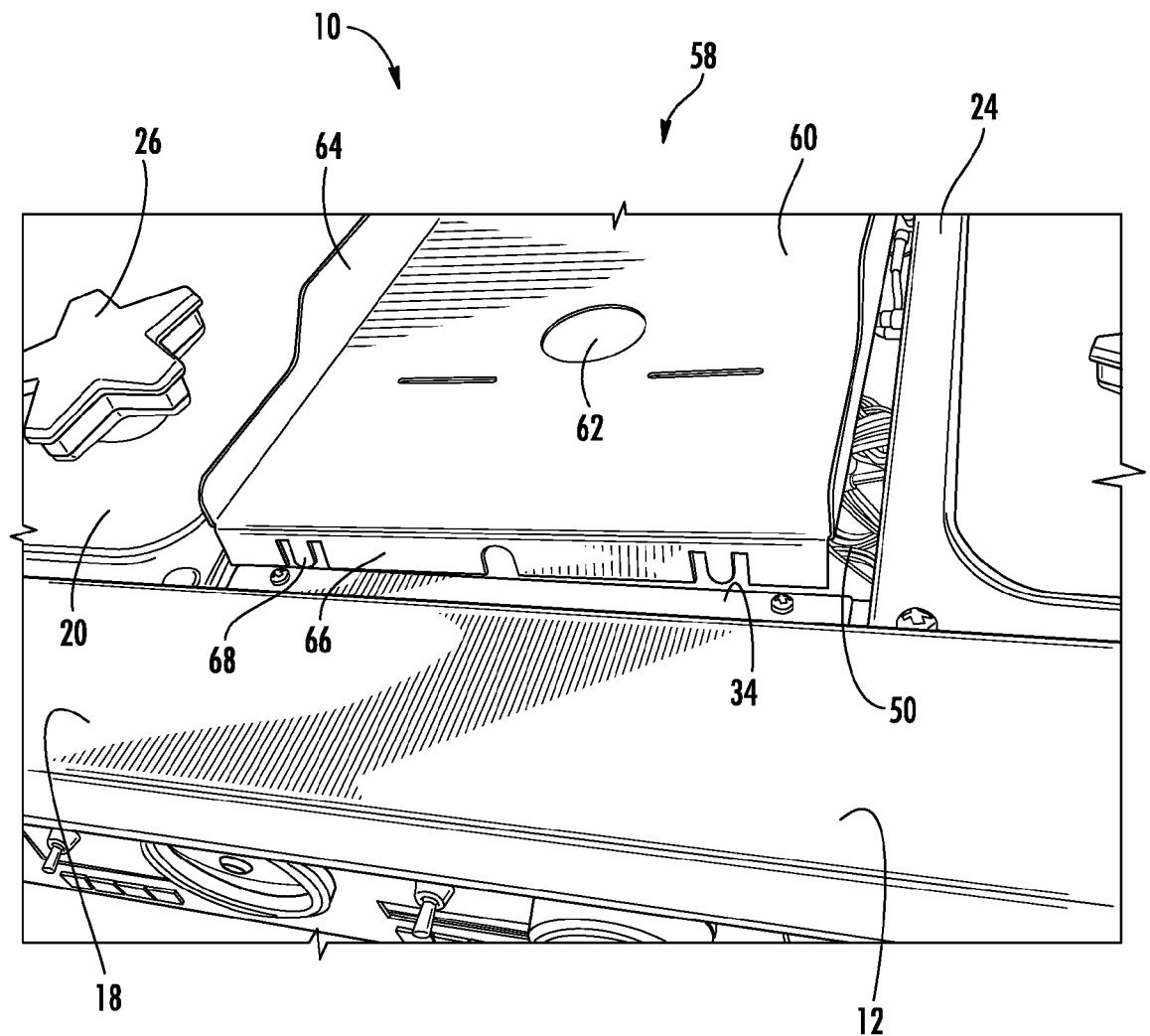
FIG. 4 is a front perspective view of a front portion of the griddle insulation retainer illustrated in FIG. 3.
Figure 5:
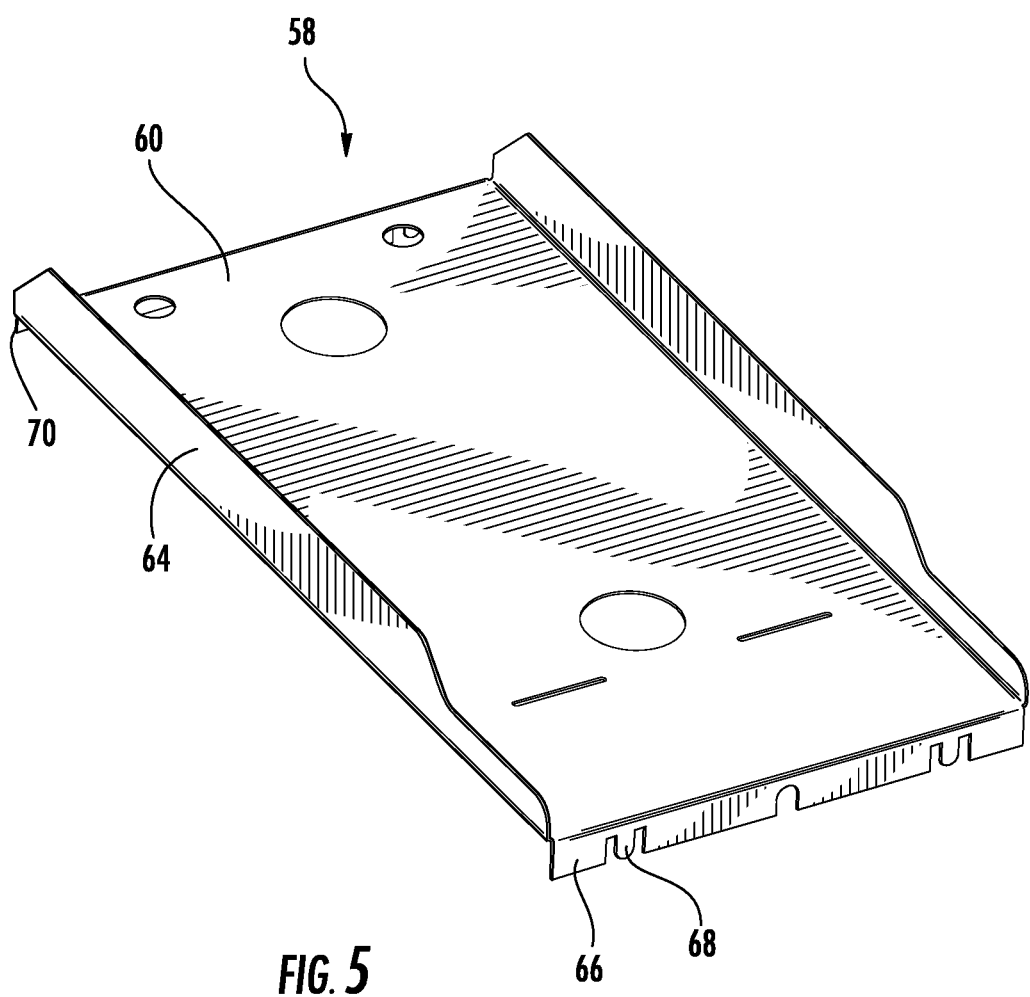
FIG. 5 is a perspective view of the griddle insulation retainer illustrated in FIG. 4.
Figure 6:
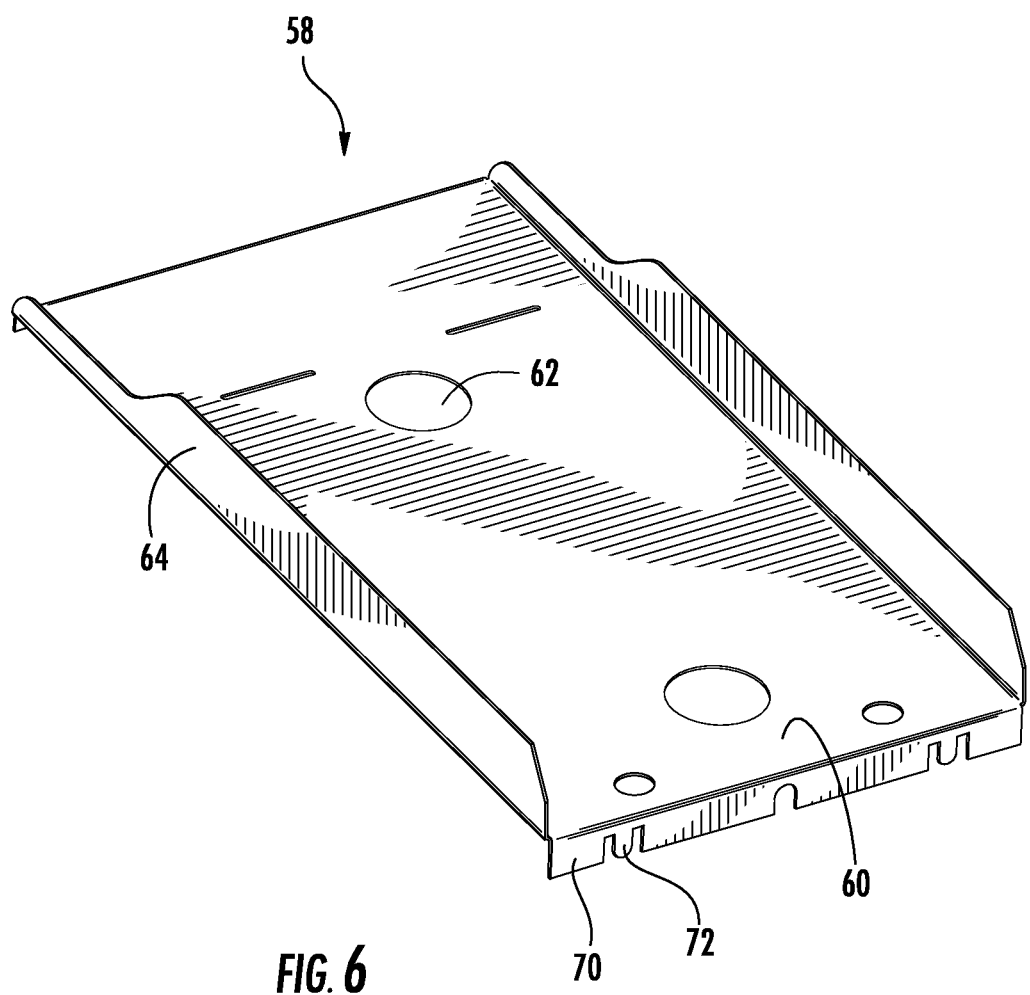
FIG. 6 is a rear perspective view of the griddle insulation retainer illustrated in FIG. 5.

With reference to FIG. 4 and FIG. 5, a griddle insulation retainer is illustrated generally at 58 and includes a generally planar base 60. The base 60 is generally rectangular and includes side walls 64 that are upturned and extend on either side along the long axis of the base 60. A downwardly directed front wall 66 is on one end of the base 60 and extends the width of the base 60. Similarly, and with reference to FIG. 6, a rear wall 70 is on the opposite end of the base 60 and extends the width of the base 60. It will be appreciated that the front wall 66 and the rear wall 70 are similar and the mounting arrangement to be described presently is the same on each end. As seen in FIG. 5 and FIG. 6, first mating components are on each of the end walls 66, 70 and include two tabs 68, 72 in each respective end wall 66, 70. The tabs 68, 72 are generally U-shaped members in the sheet metal of the griddle insulation retainer 58. The tabs 68, 72 have a spacing on either side thereof to accommodate the tab receivers as will be seen in greater detail presently.

With reference to FIG. 3 and FIG. 4, the griddle housing 32, includes a front support member 34 and a rear support member 42 for engagement with the front and rear walls of the griddle insulation retainer 58. As seen in FIG. 3, the rear support member 42 is a cross member extending along a rear portion of the cooktop 20 adjacent the backsplash 22. As seen in FIG. 4, the front support member 34 is a cross member at the front portion of the range body 12, to the rear of the controls 18.

Figure 8:
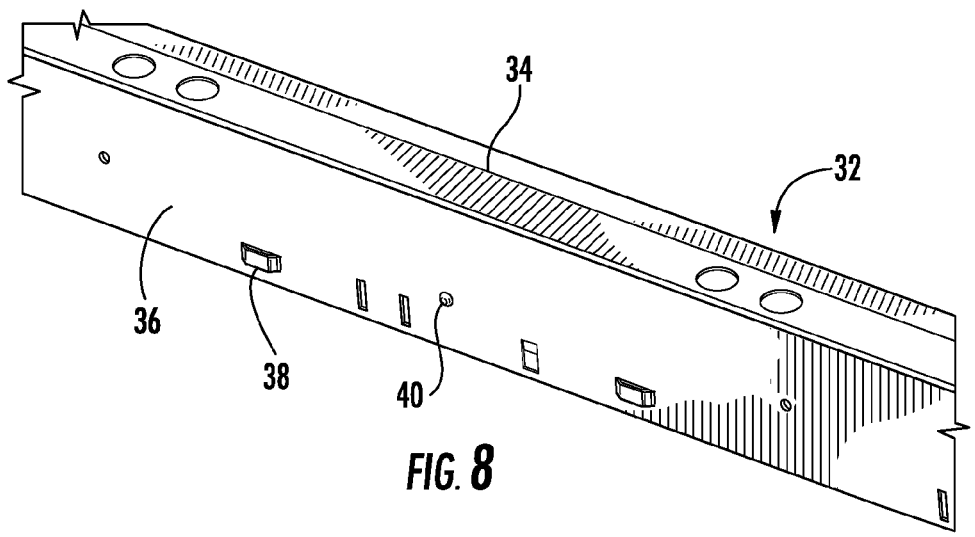
FIG. 8 is a perspective view of a front support member of the griddle housing of the range illustrated in FIG. 1.
Figure 9:
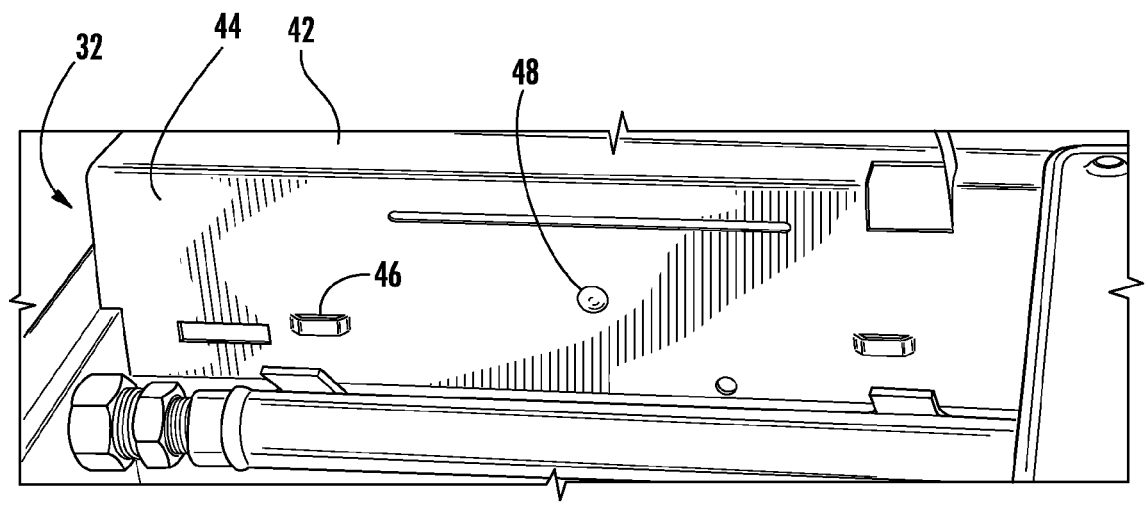
FIG. 9 is a perspective view of the rear support member of the griddle housing of the range illustrated in FIG. 1.

With reference to FIG. 8, the front support member 34 is shown to be a generally L-shaped member formed from sheet metal. Although an L-shape is illustrated in FIG. 8, it will be understood that the front support member 34, as well as the rear support member 42, can be formed in any number of shapes available to a metal fabricator and according to the design parameters of the range 10. The primary requirement of the front support member 34 and the rear support member 42, insofar as mounting the griddle insulation retainer 58 is concerned, is a planar face for contacting the planar front wall 60 and the planar rear wall 66 of the griddle insulation retainer 58. The front support member 34 includes a planar facing wall 36, as seen in FIG. 8. The rear support member 42 includes a planar facing wall 44 as seen in FIG. 9.

With reference to FIG. 8, two second mating components include two tab receivers 38 in the front support member 34 at comparable, predetermined vertical heights along the front support member facing wall 38. The tab receivers 38 are preferably bridge lances formed with a lance and form tool that uses metal from the primary structure, in this case the front support member 34, to form a metal bridge across an opening created when the bridge lance is formed. In this manner, spacing is provided between the upper surface of the bridge lance and the remainder of the support member 34 with horizontally oriented spacing to accept the tabs 68 on the front wall 64 of the griddle insulation retainer 58. A small projection 38, seen from the back side as a dimple in the metal, is on the front facing wall 36 to engage an upper surface of the griddle insulation retainer 58 to help locate the griddle insulation retainer 58 and to provide a tactile sensation when the griddle insulation retainer 58 has reached the properly mounted position. FIG. 9 illustrates the rear support member 42 with rear tab receivers 46 that are bridge lances and a projection 48 mimicking those found on the front support member 34.

Accordingly, the present invention provides four tab receivers 38, 46 that are bridge lances at either end of the griddle housing 32 that will accept tabs 68 in the front wall 66 and tabs 72 in the rear wall 70 to secure the griddle insulation retainer 58 in place within the griddle housing 32 of the range body 12. The respective projections 40, 48 assist in the proper mounting of the griddle insulation retainer 58.

Figure 7:
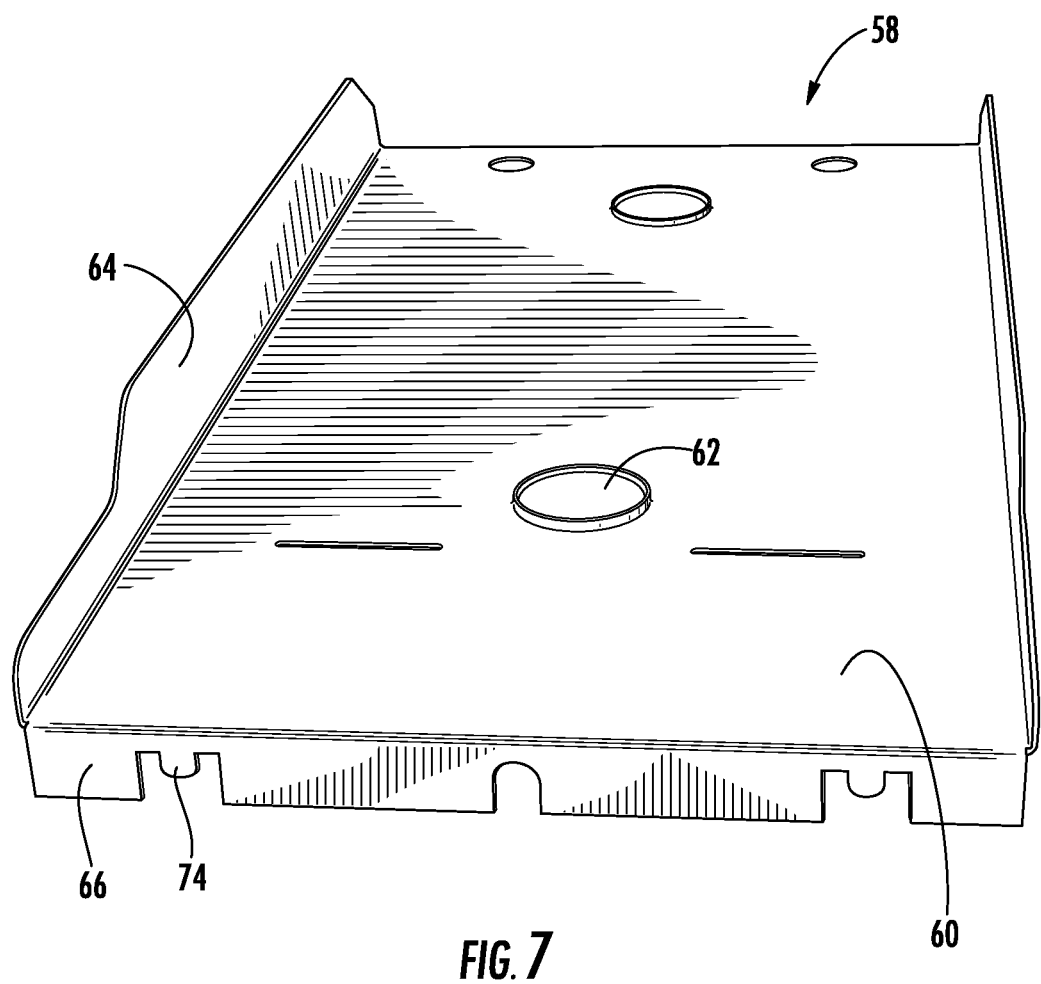
FIG. 7 is a front perspective view of a griddle insulation retainer according to a second preferred embodiment of the present invention.

FIG. 7 illustrates a second preferred embodiment of the present invention wherein the tabs 74 are approximately half the length of the tabs 68 pictured in FIG. 5. In certain cases, the use of the shorter tabs can make the griddle insulation retainer 58 an easier fit than with the longer tabs. As seen in FIG. 7, the front wall 66 includes the short tabs 70. It will be understood by those skilled in the art that the rear wall 70 can include similar short tabs (not shown).

The present invention provides substantial improvement over the current mounting arrangement that uses a number of screws that mate with aligned screw holes formed in the griddle insulation retainer and in the support members. The previous manner of mounting the griddle insulation retainer, wherein the installer brings the screw holes into registry, retains the griddle insulation retainer in place, inserts the screw into the screw holes and tightens the screw, has been improved to an essentially drop-in installation. Further, due to the tighter and more comprehensive metal-to-metal contact, the use of the tabs and bridge lances according to the present invention provides a more stable griddle structure more able to withstand packaging and shipping.

According to the present invention and in operation, with reference to FIG. 2, the griddle insulation retainer 58 is moved into the griddle space 30 for mating with the support members and, more particularly, to the rear support member facing wall 44.

With reference to FIG. 2 and FIG. 3, once the griddle insulation retainer 58 is positioned within the griddle space 30 it may be lowered into position wherein the tabs 68, 72 engage the tab receivers 38, 46. FIG. 4 illustrates the front portion of the griddle insulation retainer being lined up with the tab receivers 38 on the front support member 34. A similar situation occurs along the rear support member 42. Once the griddle insulation retainer 58 is positioned, it is pushed downwardly with the front wall tabs 68 and the rear wall tabs 72 engaging the front tab receivers 38 and the rear tab receivers 46. The engagement position may be seen in FIGS. 10 and 11 which refer to the front tabs 68 and tab receivers 38 in the front support member 34. Nevertheless, it should be appreciated that the engagement of the rear tabs 72 with the rear tab receivers 46 achieves essentially the same result illustrated in FIGS. 10 and 11.

Figure 10:
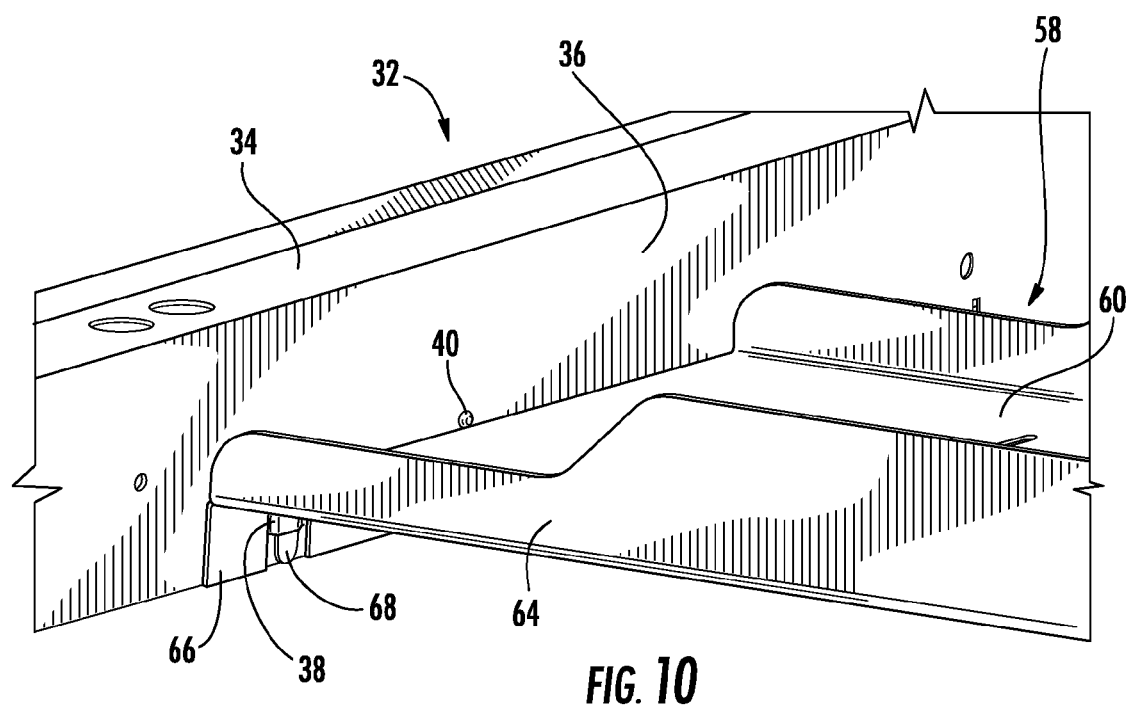
FIG. 10 is a rear perspective view of the griddle insulation retainer mounted to the front support member illustrated in FIG. 8.
Figure 11:
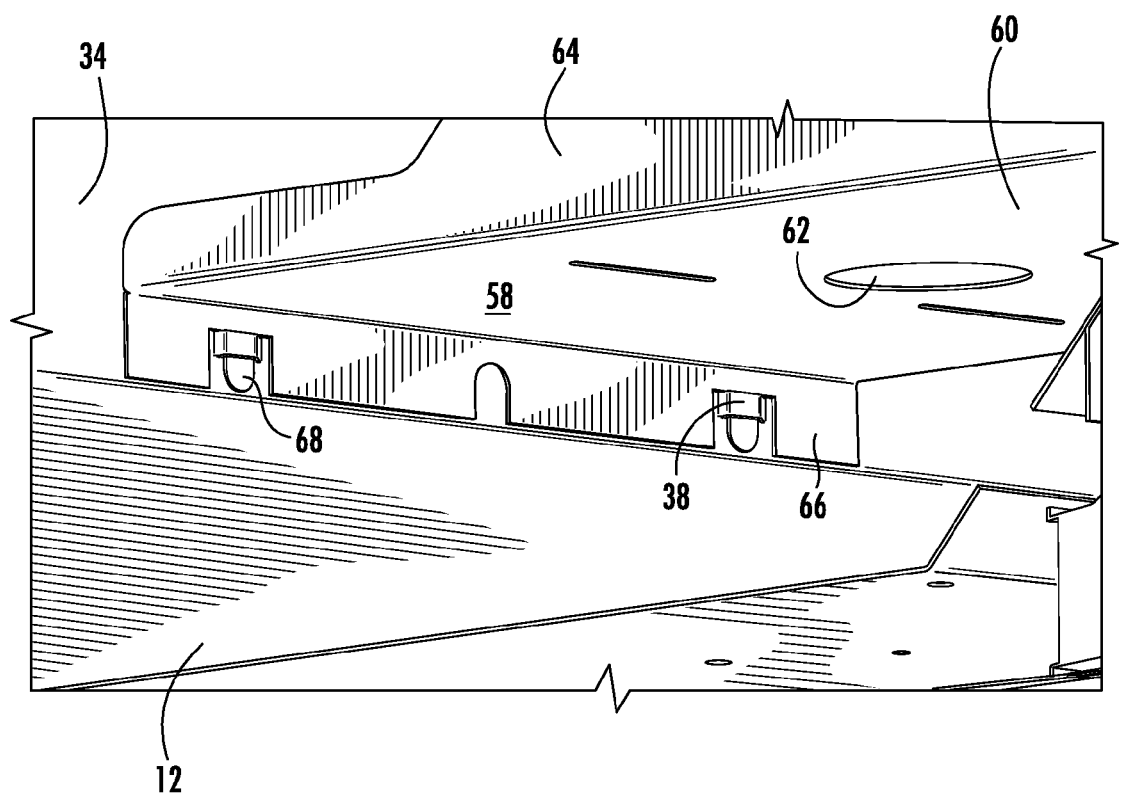
FIG. 11 is an underside perspective view of the griddle insulation retainer mounted to the front support member illustrated in FIG. 10.

Once the griddle insulation retainer 58 is positioned with the tabs 68, 72 inserted in the respective receivers 38, 46, it is pressed downwardly until the surface of the base 60 moves across the projections 40, 48 indicating that the griddle insulation retainer 58 is properly positioned and mounted. FIG. 10 illustrates the relationship between the tab receivers 38 and the tabs 68 as well as the griddle insulation retainer base 60 with the projection 40. As seen in FIG. 2, the rear portion of the griddle insulation retainer abuts the projection 48 and the griddle insulation retainer 58 is in a proper position. The insulation 56 may then be laid on top of the base 60 and the griddle itself 54 installed.

To remove the griddle insulation retainer, for example, for maintenance purposes, the griddle 54 and the insulation 56 are removed and a user grasps the base 60 of the griddle insulation retainer 58 using the opening 62 and applies an upward force to withdraw the griddle insulation retainer 58 from the range body 12. The tabs 68, 72 should readily exit the tab receivers 38, 46 and the friction of the respective projections 40, 48 on the base 60 should be easily overcome such that the griddle insulation retainer 58 may be easily removed and reinstalled after maintenance is completed.

By the above, the present invention provides an improved griddle insulation retainer having an improved, straightforward mounting system that doesn't require tools for installation or removal and enhances the ability to both remove and install the griddle insulation retainer during both manufacturing and maintenance operations. Further, the overall stability of the entire griddle is enhanced.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

What is claimed is:

1. A home appliance having a griddle comprising:
an appliance body;
a cooktop on the appliance body and defining a griddle space;
a griddle housing on the appliance body adjacent the griddle space and operatively associated with the griddle, the griddle housing including a front wall and a rear wall;
a griddle insulation retainer for removable disposition within the griddle space and defining an insulation retaining space for supporting insulation material intermediate the griddle and the griddle insulation retainer, the griddle insulation retainer including a planar base for supporting insulation material on the base, a pair of side walls formed with and projecting upwardly from the base and extending adjacent the insulation retaining space, a front wall formed with and projecting downwardly from the base away from the insulation retaining space and a rear wall formed with and projecting downwardly from the base away from the insulation retaining space, wherein the planar base includes an opening for facilitating manual removal of the griddle insulation retainer from the griddle housing; and
a mounting arrangement for mounting the griddle insulation retainer to the appliance body including a plurality of first mating components, each including a downwardly directed generally U-shaped tab formed integrally and coplanar with the griddle insulation retainer rear wall and a downwardly directed generally U-shaped tab formed integrally and coplanar with the griddle insulation retainer front wall; and a plurality of second mating components on the front wall and the rear wall of the griddle housing with each second mating component including a tab receiver having a generally horizontally extending tab receiving opening for receiving each downwardly directed generally U-shaped tab, wherein each first mating component is removably joined to each second mating component in a press-fit manner wherein each downwardly directed tab is frictionally engaged with each tab receiver, and wherein the griddle insulation retainer rear wall abuts the griddle housing.

2. The home appliance of claim 1 wherein the griddle housing includes a support member having the tab receiver formed integrally therewith.

3. The home appliance of claim 1 wherein the tab receiver is a bridge lance.

4. The home appliance of claim 1 wherein the griddle insulation retainer includes a generally planar base with the front wall and the rear wall extending a predetermined distance away from the base, and wherein the downwardly directed tab extends to a position generally equal to the outward extent of at least one of the front wall and the rear wall.

5. The home appliance of claim 1 wherein the griddle insulation retainer includes a generally planar base with the front wall and the rear wall extending a predetermined distance away from the base, and wherein the downwardly directed tab extends to a position less than equal to the outward extent of at least one of the front wall and the rear wall.

6. The home appliance of claim 1 wherein the griddle housing includes a support member having two tab receiving openings spaced a predetermined distance apart, and the griddle insulation retainer includes two downwardly directed tabs for receipt in the two tab receiving openings.

7. The home appliance of claim 6 and further comprising a projection on a support member and projecting into the griddle space, the projection being intermediate the two tab receiving openings for engagement with the griddle insulation retainer.

8. The home appliance of claim 1 wherein the griddle insulation retainer includes one of a front wall having a downwardly directed tab and a rear wall having a downwardly directed tab.

9. The home appliance of claim 1 wherein the griddle insulation retainer includes a downwardly directed wall having a downwardly directed tab and the griddle housing includes a support member having a tab receiving opening.

10. The home appliance of claim 1 wherein the griddle insulation retainer includes two downwardly directed walls, with each wall having two downwardly directed tabs and the griddle housing includes two support members, with each of the support members having two receiving openings formed by bridge lances for receiving the two downwardly directed tabs.

11. The home appliance of claim 10 and further comprising a projection on a support member intermediate the bridge lances and projecting into the griddle space.

12. A range having a griddle comprising:
a range body;
a cooktop on the range body and defining a griddle space;
a griddle housing on the range body adjacent the griddle space and operatively associated with the griddle, the griddle housing including a front wall and a rear wall;
a griddle insulation retainer for removable disposition within the griddle space and defining an insulation retaining space for supporting insulation material intermediate the griddle and the griddle insulation retainer, the griddle insulation retainer including a planar base for supporting insulation material on the base, a pair of side walls formed with and projecting upwardly from the base and extending adjacent the insulation retaining space, a front wall formed with and projecting downwardly from the base away from the insulation retaining space and a rear wall formed with and projecting downwardly from the base away from the insulation retaining space, wherein the planar base includes an opening for facilitating manual removal of the griddle insulation retainer from the griddle housing; and
a mounting arrangement for mounting the griddle insulation retainer to the appliance body including a plurality of first mating components, each including a downwardly directed generally U-shaped tab formed integrally and coplanar with the griddle insulation retainer rear wall and a downwardly directed generally U-shaped tab formed integrally and coplanar with the griddle insulation retainer front wall; and a plurality of second mating components on the front wall and the rear wall of the griddle housing with each second mating component including a tab receiver having a generally horizontally extending tab receiving opening for receiving each downwardly directed generally U-shaped tab, wherein each first mating component is removably joined to each second mating component in a press-fit manner wherein each downwardly directed tab is frictionally engaged with each tab receiver, and wherein the griddle insulation retainer rear wall abuts the griddle housing.

13. The range of claim 12 wherein the griddle housing includes a support member having the tab receiver formed integrally therewith.

14. The range of claim 12 wherein the tab receiver is a bridge lance.

15. The range of claim 12 wherein the griddle insulation retainer includes a generally planar base with the front wall and the rear wall extending a predetermined distance away from the base, and wherein the downwardly directed tab extends to a position generally equal to the outward extent of at least one of the front wall and the rear wall.

16. The range of claim 12 wherein the griddle insulation retainer includes a generally planar base with the front wall and the rear wall extending a predetermined distance away from the base, and wherein the downwardly directed tab extends to a position less than equal to the outward extent of at least one of the front wall and the rear wall.

17. The range of claim 12 wherein the griddle housing includes a support member having two tab receiving openings spaced a predetermined distance apart, and the griddle insulation retainer includes two downwardly directed tabs for receipt in the two tab receiving openings.

18. The range of claim 17 and further comprising a projection on a support member and projecting into the griddle space, the projection being intermediate the two tab receiving openings for engagement with the griddle insulation retainer.

19. The range of claim 12 wherein the griddle insulation retainer includes one of a front wall having a downwardly directed tab and a rear wall having a downwardly directed tab.

20. The range of claim 12 wherein the griddle insulation retainer includes a downwardly directed wall having a downwardly directed tab and the griddle housing includes a support member having a tab receiving opening.

21. The range of claim 12 wherein the griddle insulation retainer includes two downwardly directed walls, with each wall having two downwardly directed tabs and the griddle housing includes two support members, with each of the support members having two receiving openings formed by bridge lances for receiving the two tabs.

22. The range of claim 21 and further comprising a projection on the support members intermediate the bridge lances and projecting into the griddle space.

23. A range having a griddle comprising:
   a range body;
   a cooktop on the range body and defining a griddle space;
   a griddle housing on the range body adjacent the griddle space and operatively associated with the griddle, the griddle housing including a front wall and a rear wall;
   a griddle insulation retainer for removable disposition within the griddle space and defining an insulation retaining space for supporting insulation material intermediate the griddle and the griddle insulation retainer, the griddle insulation retainer including a planar base for supporting insulation material on the base, a pair of side walls formed with and projecting upwardly from the base and extending adjacent the insulation retaining space, a front wall formed with and projecting downwardly from the base away from the insulation retaining space and a rear wall formed with and projecting downwardly from the base away from the insulation retaining space wherein the planar base includes an opening for facilitating manual removal of the griddle insulation retainer from the griddle housing; and;
   a sheet of insulation material intermediate the griddle and the griddle insulation retainer;
   a plurality of electronic components underneath the griddle insulation retainer; and
   a mounting arrangement for mounting the griddle insulation retainer to the appliance body including a plurality of first mating components, each including a downwardly directed generally U-shaped tab formed integrally and coplanar with the griddle insulation retainer rear wall and a downwardly directed generally U-shaped tab formed integrally and coplanar with the griddle insulation retainer front wall; and a plurality of a second mating components on the front wall and the rear wall of the griddle housing with each second mating component including a tab receiver having a generally horizontally extending tab receiving opening for receiving each downwardly directed generally U-shaped tab, wherein each first mating component is removably joined to each second mating component in a press-fit manner wherein each downwardly directed tab is frictionally engaged with each tab receiver, and wherein the griddle insulation retainer rear wall abuts the griddle housing.

24. The home appliance of claim 1 wherein each side wall extends to a first height adjacent the front wall and extends to a second height adjacent the rear wall wherein the first height is less than the second height.

* * * * *